Nov. 16, 1954 K. DAUGIRDAS 2,694,240
MOLD EJECTING APPARATUS
Filed July 22, 1952 2 Sheets-Sheet 1

INVENTOR.
KRISTUPAS DAUGIRDAS
BY
HIS ATTORNEY

Nov. 16, 1954     K. DAUGIRDAS     2,694,240
MOLD EJECTING APPARATUS

Filed July 22, 1952     2 Sheets—Sheet 2

INVENTOR.
KRISTUPAS DAUGIRDAS
BY Albert J. Henderson
his ATTORNEY

United States Patent Office 2,694,240
Patented Nov. 16, 1954

2,694,240

MOLD EJECTING APPARATUS

Kristupas Daugirdas, South Boston, Mass., assignor to Walworth Company, Boston, Mass., a corporation of Massachusetts Application July 22, 1952, Serial No. 300,195

14 Claims. (Cl. 22—34)

This invention relates to apparatus for making shell-type molds and more particularly to means for removing molds and pattern plates from such apparatus.

Shell-type molds are usually formed on a metallic pattern plate and are stripped therefrom by means of axially movable ejector pins extending through the pattern plate for engagement with the molds. The pins are carried by the pattern plate and axial movement is imparted thereto to dislodge the mold by an actuator engageable therewith and movable relative to the pattern plate. It is a principal object of this invention to utilize such an actuator for removing pattern plates from a mold making apparatus.

Another object of this invention is to simplify the removal of pattern plates from mold forming apparatus.

Another object of this invention is to impart movement to a pattern plate and a mold stripping device through a single means.

Another object of this invention is to adjust the mold stripping device to perform either mold or pattern removal at the will of an operator.

Other objects and advantages will appear from the following specification taken in connection with the accompanying drawings wherein.

Figure 1:
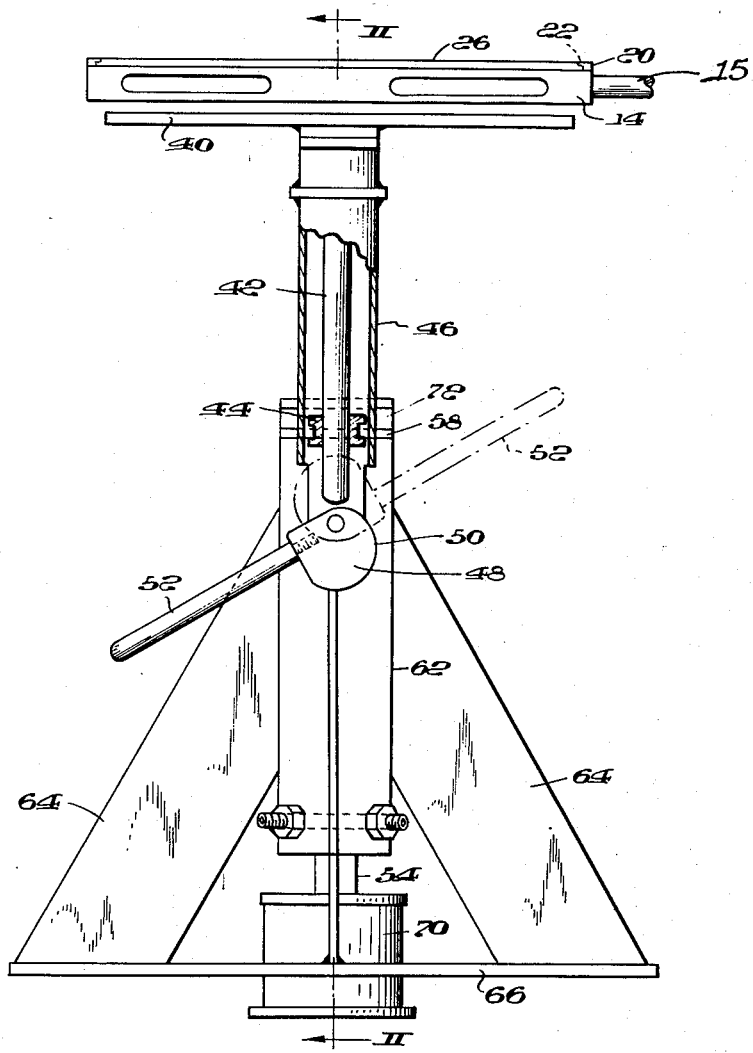
Fig. 1 is an elevation, partly in section, of a mold forming apparatus embodying this invention.
Figure 2:
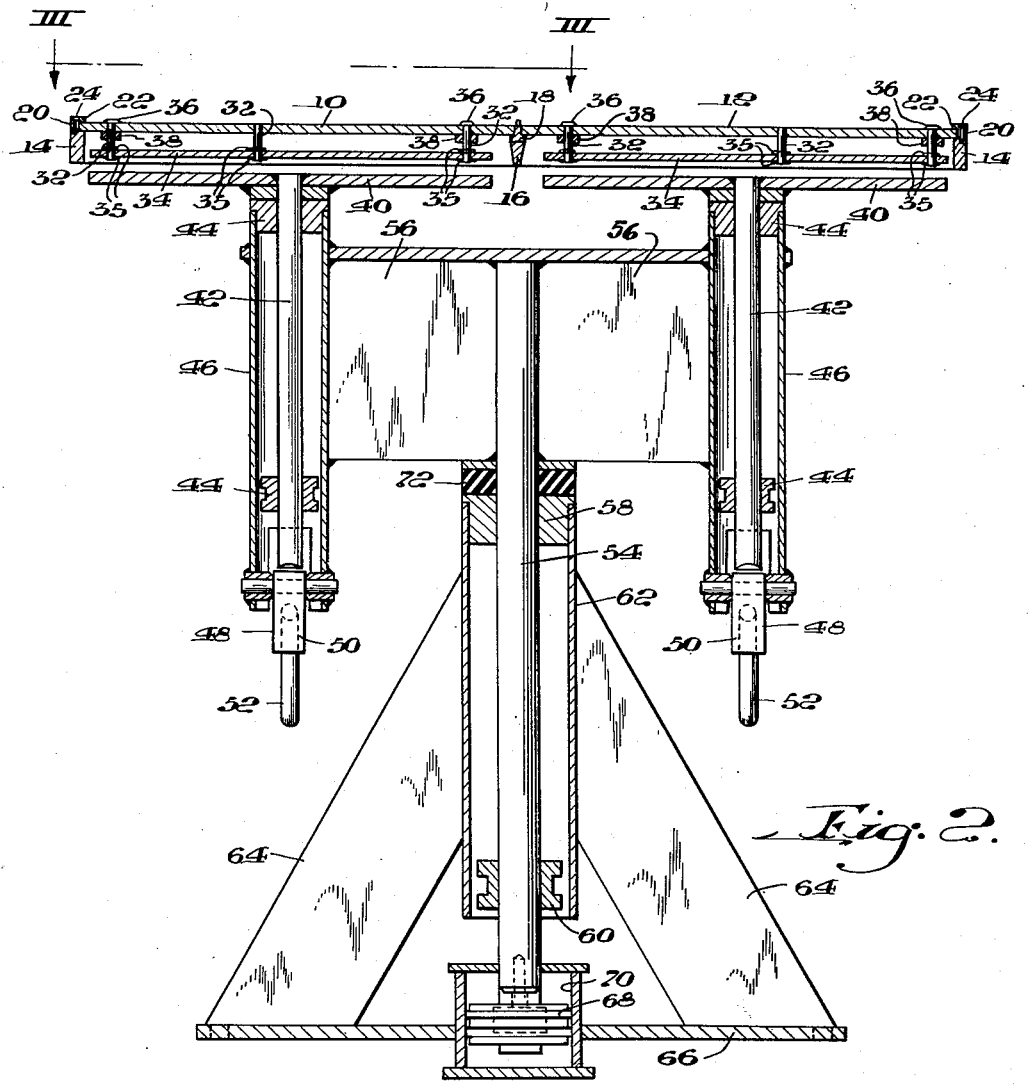
Fig. 2 is a sectional view taken on the line II—II of Fig. 1.
Figure 3:
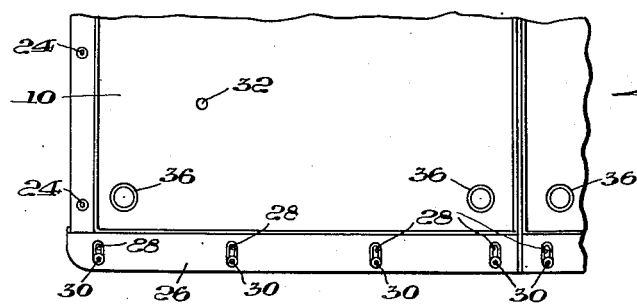
Fig. 3 is a fragmentary plan view taken on the line III—III of Fig. 2.

Referring more particularly to the drawings, a plurality (here shown as two) of pattern plates 10, 12 are mounted on a generally rectangular frame 14. The frame 14 may form part of a shell mold making machine (not shown) having a cylindrical shaft or arm 15 on which the frame 14 is supported. A laterally extending rib 16 bisects the frame 14 and supports a dividing strip 18 of generally T-shaped cross-section, the leg of which is adapted to be disposed between the pattern plates 10, 12. The edge of each pattern plate 10, 12 opposite the edge in engagement with the dividing strip 18 is securely clamped to the frame 14 by a clamping strip 20. Each clamping strip 20 is provided with a laterally extending lip 22 adapted to engage the top of the pattern plates 10, 12 respectively. A plurality of bolts 24 extend through the strips 20 and are threaded into the frame 14 to secure the strips 20 to the frame and thereby clamp the pattern plates 10, 12 between the lips 22 of the strips 20 and the frame 14.

The other two edges of each pattern plate 10, 12 are clamped to the frame 14 by clamping strips 26 each of which has a pattern plate engaging lip similar to the lip 22 of the strip 20. Each of the strips 26 is provided with a plurality of spaced elongated apertures 28 adapted to receive a plurality of bolts 30 which are threaded into the frame 14. The apertures 28 extend laterally of the strips 26 and are parallel to each other to permit slidable movement of the strips 26 when the bolts 30 are loosened. With the clamping arrangement described, the pattern plates 10, 12 may be released from the frame 14 by removing the strips 20, loosening the bolts 30, and sliding the strips 26 out of engagement with the pattern plates.

Each of the pattern plates 10, 12 is provided with a device for dislodging a finished mold therefrom. Each such device takes the form of a plurality of ejector pins 32 slidably mounted in a plurality of bores formed in the pattern plate and secured by any suitable means at their lower ends to a supporting plate 34. The means for securing each pin 32 to its support plate 34 is here shown as a pair of snap rings 35 carried in spaced grooves on each pin 32 and adapted to abut opposite sides of the plate 34. In its normal position, the supporting plate 34 depends from the ejector pins 32, withdrawal of the pins 32 from the pattern plate being prevented by suitable heads 36 formed on selected pins 32 and adapted to engage the top surface of the pattern plate.

As is customary in devices of this type, movement of the support plate 34 toward its associated pattern plate 10/12 will move the ejector pins 32 through the pattern plate to dislodge a mold therefrom. Such movement of the support plate 34 is limited by a plurality of stops in the form of bosses 38 formed on the underside of the pattern plates 10, 12.

Movement of the supporting plates 34 relative to the pattern plates 10, 12 is effected by a pair of actuating elements movable toward and away from the pattern plates 10, 12 and arranged to be located beneath the same. These actuating elements are identical and each may comprise a plate 40 disposed beneath and parallel to the plate 34. Each plate 40 is secured to one end of a shaft 42 slidably mounted in a pair of spaced bearings 44 carried by a supporting casing 46.

Each plate 40 is normally seated on its supporting casing 46, however, means is provided to adjust the relative positions thereof and space the plate 40 from the supporting casing 46. This means is here shown as comprising a rotatable element 48 journaled in the supporting casing 46 and disposed in underlying relation with the free end of the shaft 42. The rotatable element 48 is non-circular in form and the outer periphery thereof forms a cam surface 50.

A handle 52 extends from the rotatable element 48 and may be manually manipulated to rotate the same relative to the supporting casing 46. Rotation of the rotatable element 48 in a counterclockwise direction to the broken line position as shown in Fig. 1, will cause the shaft 42 to ride up the cam surface 50 moving upward as viewed in the drawing to space the plate 40 from the supporting casing 46.

The supporting casings 46 of the ejector actuating elements are disposed in spaced parallel relation to each other and are secured to one end of a rectilinearly movable shaft 54 by means of gusset plates 56 welded or otherwise secured thereto. The shaft 54 is slidably mounted in a pair of spaced bearings 58, 60 mounted in a suitable casing 62. Supporting the casing 62 is a plurality of legs 64 secured thereto and extending from a foundation 66.

The end of the shaft 54, opposite the end to which are secured the supporting casings 46, carries a piston 68 of a fluid pressure operated motor device 70. Admission and release of fluid under pressure to and from the motor 70 will impart reciprocating movement to the shaft 54 and the actuating elements carried thereby.

An annular resilient cushion 72 may be interposed between the bearing 58 and the gusset plates 56 to absorb impacts necessarily associated with movement of the shaft 54 to its lowermost position.

Operation

Assume that the apparatus is in the condition shown in the drawings with a finished mold on each pattern plate 10, 12 and it is desired to eject the molds. Fluid under pressure is admitted to the motor 70 beneath the piston 68 to move the piston 68 and associated shaft 54 upward as viewed in the drawings. Such movement of the shaft 54 will raise the supporting casings 46, the plates 40 moving therewith and engaging the support plates 34 of the ejector devices. The plates 34 and associated ejector pins 32 are then moved upward with the plates 40 until the piston 68 reaches the end of its stroke. It is to be noted that this stroke is of such length that the plates 34 will approach but will not engage the bosses 38 formed on the underside of the pattern plates 10, 12 during the mold ejection operation.

Upward movement of the ejector pins 32 will serve to dislodge molds formed on the pattern plates 10, 12 and the molds may then be manually removed. After removal of the molds, fluid pressure is released from the motor 70 and the piston 68 returns to its initial position under the influence of gravity carrying with it the shaft 54, supporting casings 46, and actuator plates 40.

In the event it is desired to remove the pattern plates 10, 12 from the frame 14, the handles 52 are manipulated to rotate the rotatable elements 48 to the broken line position shown in Fig. 1. Such rotation of the rotatable elements 48 will cause the shafts 42 to ride up the cam surfaces 50 thereby moving the shafts 42 axially of the supporting casings 46 and spacing the actuator plates 40 above the supporting casings 46.

The pattern plates 10, 12 are unclamped from the frame 14 by removing the clamping strips 20, loosening the bolts 30 and sliding the clamping strips 26 out of engagement with the pattern plates.

Fluid under pressure is then admitted to the motor 70 beneath the piston 68 to move the piston 68 upward as viewed in the drawings. Upward movement of the piston 68 is transmitted to the actuator plates 40 through the shaft 54, gusset plates 56, supporting casings 46, rotatable cam elements 48, and shafts 42. Since the initial positions of the plates 40 is now considerably closer to the pattern plates 10, 12 the stroke of the piston 68 will be sufficient to move the actuator plates 40 into engagement with the support plates 34 and move the same into engagement with the bosses 38 to transmit forces directly to the pattern plates 10, 12. Such forces will be effective to lift the pattern plates 10, 12 from the frame 14 and they may then be easily removed by an operator.

In the event a single pattern plate is to be removed from the frame 14, only one of the handles 52 is manipulated to position its associated actuator plate 40 in the uppermost position so that upon actuation of the shaft 54 by the piston 68, only one of the actuator plates will be moved into operative engagement with the bosses 38 and only one of the pattern plates will be raised from the frame 14.

It will be apparent that with the apparatus disclosed, the dividing strip 18 may be dispensed with and a single large pattern plate secured to the frame 14 without detracting from the utility of the disclosed ejector actuating mechanism.

It will be apparent from the foregoing that a relatively simple and efficient means has been provided to remove molds from a pattern or to remove patterns from their supporting frames and that pattern removal has been considerably simplified. It will also be understood that the invention is not limited to the precise embodiment hereinbefore described but is susceptible to changes without departing from the scope thereof as defined by the appended claims.

It is claimed and desired to secure by Letters Patent:

1. In a mold forming apparatus, the combination comprising a frame member, a pattern plate on said frame member, ejection means movable between a plurality of positions relative to said frame member, means for moving said ejection means to one position wherein the same is effective to eject a mold from said pattern plate, and means for moving said ejection means to another position wherein the same is effective to position said pattern plate away from said frame member.

2. In a mold forming apparatus, the combination comprising a frame member, a pattern plate on said frame member, ejection means movable between a plurality of positions relative to said frame member, means for moving said ejection means to one position wherein the same is effective to dislodge a mold from said pattern plate and means for adjusting said last named means to move said ejection means to another position wherein the same is effective to position said pattern plate away from said frame member.

3. In a mold forming apparatus, the combination comprising a frame member, a pattern plate on said frame member, ejection means movable relative to said pattern plate for ejecting a mold therefrom, a thrust element, motor means for imparting limited movement to said thrust element for moving the same into operative engagement with said ejection means and imparting said relative movement thereto, and means for adjusting said motor means to cause the same to move said ejection means into operative engagement with said pattern plate to move the same away from said frame member.

4. Apparatus as claimed in claim 3 wherein said adjusting means comprises a connection including cam means between said motor means and said thrust element, said cam means being operable to vary the length of said connection.

5. In a mold forming apparatus, the combination comprising a frame member, a plurality of pattern plates on said frame member, ejection means operatively associated with each of said pattern plates, a plurality of movable thrust elements respectively engageable with said ejection means for imparting movement thereto, motor means, and a connection between each of said thrust elements and said motor means, each of said connections including means for adjusting the length thereof whereby each of said thrust elements may be moved into operative engagement with its associated ejection means for moving the associated pattern plate away from said frame member.

6. In a mold forming apparatus, the combination comprising a frame member, a plurality of pattern means on said frame member, ejection means operatively associated with each of said pattern plates, motor means including a rectilinearly movable actuating element movable between first and second positions, a plurality of spaced supports connected to said member for movement therewith, a thrust element carried by each of said supports for operative engagement with said ejection means to actuate hte same when said actuating element is moved from said first to said second position, and means for adjusting the position of each of said thrust elements relative to its associated support whereby each of said thrust elements may be moved into operative engagement with its associated ejection means to move the associated pattern plate away from said frame member upon movement of said actuating element to said second position.

7. Apparatus as claimed in claim 6 wherein each of said adjusting means includes a rotatable element cooperable with one of said supports and its associated thrust element.

8. Apparatus as claimed in claim 7 wherein said rotatable element is journaled on said support and provided with a cam surface operatively engageable with said thrust element.

9. In a mold forming apparatus, the combination comprising a frame member, pattern means on said frame member, mold ejection means operatively associated with said pattern means, motor means including a rectilinearly movable actuating element movable between first and second positions, a thrust element operatively connected to said actuating element and arranged for operative engagement with said ejection means to actuate the same when said actuating element is moved from said first to said second position, and means for adjusting the position of said thrust element relative to said actuating element whereby said thrust element may be moved into operative engagement with said ejection means to move the pattern means away from said frame member upon movement of said actuating element to said second position.

10. The combination claimed in claim 9 wherein said adjusting means includes a rotatable element cooperable with said actuating element and said thrust element.

11. The combination claimed in claim 10 wherein said rotatable element is provided with a cam surface operatively engageable with said thrust element.

12. In a mold forming apparatus, the combination comprising a frame member, apertured pattern means on said frame member, ejection means movable relative to said pattern plate for ejecting a mold therefrom, said ejection means including a support plate spaced from the underside of said pattern plate, a plurality of ejector pins extending from said support plate through said apertured pattern plate, actuating means for moving said ejector plate toward said pattern plate and projecting said pins therethrough sufficiently to eject a mold therefrom, and means for adjusting said actuating means for moving said ejector palte into operative engagement with said pattern plate to lift the same away from said frame member.

13. Apparatus as claimed in claim 12 wherein said adjusting means comprises a telescopic connection arranged for manual adjustment to vary the position of said actuating means relative to said ejector plate.

14. Apparatus as claimed in claim 13 wherein said actuating means includes a thrust element, motor means for imparting limited movement to said thrust element for moving the same into operative engagement with said ejector plate, said telescopic connection comprising cam means between said motor means and said thrust element and operable to increase the length of said connection and thereby increase the movement of said thrust element.

References Cited in the file of this patent

UNITED STATES PATENTS

| Number | Name | Date |
|---|---|---|
| 1,782,762 | Morris et al. | Nov. 25, 1930 |

OTHER REFERENCES

The Iron Age, April 19, 1951, pages 81–85.